(12) United States Patent
Kishbaugh et al.

(10) Patent No.: US 7,575,127 B2
(45) Date of Patent: Aug. 18, 2009

(54) GLASSWARE WITH SILICONE GRIPPING SURFACES

(75) Inventors: Ronald G. Kishbaugh, Elmira, NY (US); William R. Pfaff, Millerton, PA (US); Mark P. Cooley, Bentleyville, PA (US); Sarah O'Neil, Chicago, IL (US); Brian T. Lyke, Chicago, IL (US); Anthony F. Vallone, Williamsburg, VA (US)

(73) Assignee: WKI Holding Company, Inc., Rosemont, IL (US)

( * ) Notice: Subject to any disclaimer, the term of this patent is extended or adjusted under 35 U.S.C. 154(b) by 431 days.

(21) Appl. No.: 11/348,822

(22) Filed: Feb. 7, 2006

(65) Prior Publication Data

US 2006/0248851 A1 Nov. 9, 2006

Related U.S. Application Data

(63) Continuation-in-part of application No. 11/050,532, filed on Feb. 3, 2005.

(51) Int. Cl.
*B65D 25/10* (2006.01)
*B65D 53/00* (2006.01)
*B65D 81/24* (2006.01)

(52) U.S. Cl. ............. 220/755; 220/573.1; 220/574; 220/753

(58) Field of Classification Search ........... 220/573.1, 220/574, 752, 753, 771, 755
See application file for complete search history.

(56) References Cited

U.S. PATENT DOCUMENTS

| | | | |
|---|---|---|---|
| 63,653 | A | 4/1867 | Rand |
| 282,444 | A | 7/1883 | Vernon |
| 2,018,271 | A | 10/1935 | Lewis |
| 2,517,248 | A | 8/1950 | Semeyn |
| 2,548,035 | A | 4/1951 | May |

(Continued)

FOREIGN PATENT DOCUMENTS

WO WO 02/26087 A2 4/2002

OTHER PUBLICATIONS

Images of porcelain grater manufactured by Japan Porlex Co., Ltd., available in Japan at least as early as Feb. 3, 2004, 5 pages.

(Continued)

*Primary Examiner*—Anthony D Stashick
*Assistant Examiner*—Harry A Grosso
(74) *Attorney, Agent, or Firm*—McDermott Will & Emery LLP

(57) ABSTRACT

A glass dish suitable for use in cooking applications is provided. The glass dish comprises a substantially homogenous glass body, a channel formed in a portion of the glass body and a silicone gripping surface. The channel has an open end and an inner surface comprised of a substantially planar bottom wall, an inner sidewall and an outer sidewall. The channel has a predetermined depth $D_o$, and an open end of the channel has a predetermined width $W_o$. The silicone gripping surface is comprised of a protruding extent and an interior extent. The interior extent is disposed within the channel and directly contacts a portion of the inner surface and is adhered to the inner surface of the channel by chemical adhesion. The protruding extent protrudes beyond the open end of the channel.

10 Claims, 7 Drawing Sheets

U.S. PATENT DOCUMENTS

| | | | |
|---|---|---|---|
| 3,956,565 A | 5/1976 | Bolen et al. |
| 3,986,248 A | 10/1976 | Meshberg et al. |
| 4,040,882 A | 8/1977 | LeGrand et al. |
| 4,204,021 A | 5/1980 | Becker |
| 4,263,362 A | 4/1981 | Straka |
| 4,332,844 A | 6/1982 | Hamada et al. |
| 4,337,295 A * | 6/1982 | Rittler ..................... 428/410 |
| 4,401,500 A | 8/1983 | Hamada et al. |
| 4,606,496 A | 8/1986 | Marx et al. |
| 4,623,565 A | 11/1986 | Huybrechts et al. |
| 4,659,851 A | 4/1987 | Plueddemann |
| 4,745,139 A | 5/1988 | Haasl et al. |
| 4,754,013 A | 6/1988 | Antonen |
| 4,767,015 A | 8/1988 | Ho |
| 4,814,230 A | 3/1989 | Vockler |
| 4,860,906 A | 8/1989 | Pellegrini et al. |
| 4,906,686 A | 3/1990 | Suzuki et al. |
| 4,959,903 A | 10/1990 | Daoust et al. |
| 4,959,937 A | 10/1990 | Mayer |
| 4,961,996 A | 10/1990 | Carre et al. |
| 5,034,061 A | 7/1991 | Maguire et al. |
| 5,043,369 A | 8/1991 | Bahn et al. |
| 5,158,193 A | 10/1992 | Chen |
| 5,335,769 A | 8/1994 | Klokkers-Bethke et al. |
| 5,364,921 A | 11/1994 | Gray et al. |
| 5,411,771 A | 5/1995 | Tsai |
| 5,424,135 A | 6/1995 | Murata et al. |
| 5,455,102 A | 10/1995 | Tsai |
| 5,576,054 A | 11/1996 | Brown |
| 5,584,414 A | 12/1996 | Neubeck |
| 5,644,976 A | 7/1997 | Muchin et al. |
| 5,691,067 A | 11/1997 | Patel |
| 5,806,410 A | 9/1998 | Muchin et al. |
| 5,813,638 A | 9/1998 | Morris |
| 5,860,559 A | 1/1999 | Wang |
| 5,868,063 A | 2/1999 | Longmuir |
| 5,988,419 A | 11/1999 | St John |
| 6,029,843 A | 2/2000 | Kroscher et al. |
| 6,197,438 B1 | 3/2001 | Faulkner |
| 6,257,752 B1 | 7/2001 | Browne |
| 6,258,418 B1 | 7/2001 | Rudder et al. |
| 6,331,328 B1 | 12/2001 | Cheng |
| 6,454,456 B2 | 9/2002 | Browne |
| 6,491,992 B1 | 12/2002 | Koizumi et al. |
| 6,520,369 B1 | 2/2003 | Cytacki |
| 6,613,185 B1 | 9/2003 | Valade et al. |
| 6,630,650 B2 | 10/2003 | Bassill et al. |
| 6,649,891 B1 | 11/2003 | Kitko et al. |
| 6,921,787 B2 | 7/2005 | Bate |
| 6,930,063 B2 | 8/2005 | Keese |
| 2003/0079823 A1 | 5/2003 | Sabia |
| 2003/0219583 A9 | 11/2003 | Koizumi et al. |
| 2003/0227119 A1 | 12/2003 | Jackson |
| 2004/0072942 A1 | 4/2004 | Chen |
| 2004/0112903 A1 * | 6/2004 | LoGiudice et al. ....... 220/573.1 |

OTHER PUBLICATIONS

Silicone Rubber Properties—HVI Workshop—GE—Silicones, Dec. 21, 2004, 5 pages.

* cited by examiner

US 7,575,127 B2

GLASSWARE WITH SILICONE GRIPPING SURFACES

CROSS-REFERENCE TO RELATED APPLICATIONS

This is a continuation-in-part application of co-pending U.S. patent application Ser. No. 11/050,532 entitled "Glassware With Silicone Support" filed Feb. 3, 2005, and which is incorporated herein by reference.

TECHNICAL FIELD

The invention relates to glass houseware. More particularly, the invention relates to a glass dish having a silicone gripping surface disposed within a channel formed therein.

BACKGROUND OF THE INVENTION

Glassware such as glass houseware may slide on smooth surfaces such as a countertop or table causing damage to the smooth surfaces as well as possible spillage of the contents of the glassware. Slippage challenges also arise when consumers attempt to grasp smooth handle surfaces of glassware products.

Various devices have been employed in an attempt to prevent or minimize this tendency. For example, an india rubber ring has been placed in a recess on the bottom of hollow ware. The india rubber ring forms a non-slip barrier between the hollow ware and furniture or other surfaces upon which the item is to be rested. However, use of india rubber in connection with glassware has numerous disadvantages. For example, india rubber has significant disadvantages with respect to its use in high temperature applications. In particular, india rubber is susceptible to deformation and melting when subjected to high temperatures, thereby limiting its effective use on glassware used in conventional ovens, microwaves and other high temperature environments. Accordingly, there exists a need for glassware having a non-slip surface which can be used in both low and high temperature environment.

Silicone generally exhibits good non-slip characteristics, has a high tolerance to elevated temperatures and readily accepts colorants and dyes. While it is believed that elastomers such as silicone have been used to some degree on ceramics, ceramic dishware inherently has certain limitations. In particular, the brittleness and certain physical and thermal characteristics of ceramic dishware, not generally associated with glass dishware, make the use of ceramic dishware undesirable and impractical in certain cooking applications. Moreover, use of silicone as a non-slip surface for ceramic products has several disadvantages. For example, silicone has very limited natural adhesion to ceramic material. Accordingly, it is often necessary to apply an intermediate glass-like coating to the ceramic item to achieve some degree of adhesion between the silicone and the ceramic. The need for such an intermediate agent to provide the necessary bonding characteristics creates a potentially less reliable adhesion, and increases overall product cost and manufacturing time. Therefore, a needs exists to provide for a substantially homogenous glass dish with a silicone support that adheres directly to the dish without an intermediate adhesive or bonding agent.

It is also known to apply silicone to glass to provide a protective surface for fragile glassware items as for example is shown in U.S. Pat. No. 4,860,906 to Pellegrini et al. U.S. Pat. No. 4,860,906 is directed to a thin-walled glass container that is subjected to intermittent periods of rapid heating and cooling, wherein preferably substantially the entire exterior surface of the glass container is coated by a silicone elastomer safety applied thereto by using conventional dipping and spraying techniques. While the application of silicone to glass described in U.S. Pat. No. 4,860,906 is suitable for protecting thin glassware from breakage, the use of silicone described therein has significant disadvantages in non-slip applications in which a coating is not required or desirable.

For example, the use of silicone coating as a non-slip surface for glassware can be costly in view of the relative material costs, particularly if the silicone is applied using traditional dipping, spraying or coating techniques such as is taught by U.S. Pat. No. 4,860,906. Moreover, certain difficulties arise when attempting to use a targeted silicone appliqué as a non-slip surface, that may not occur with silicone coatings such as that described in U.S. Pat. No. 4,860,906. In particular, silicone has an undesirable tendency to peel away from glass when shear forces are applied thereto, thereby exposing both the glassware and the silicone to damage. Glassware such as houseware is also typically subjected to extensive wear during ordinary use that may result in the silicone suffering mechanical damage. Thus, a need exists to minimize the quantity of silicone used, while providing sufficient silicone to benefit from desirable non-slip qualities of silicone. A need also exists to provide a mechanism that protects the silicone application from physical damage in finished glassware products.

The present invention is provided to solve the problems discussed above and other problems, and to provide advantages and aspects not provided by prior glassware. A full discussion of the features and advantages of the present invention is deferred to the following detailed description, which proceeds with reference to the accompanying drawings.

SUMMARY OF THE INVENTION

The present invention provides a dish with a silicone support, and a method of manufacturing the same. In one embodiment, a glass dish is provided. The dish is comprised of a substantially homogenous glass body, a channel formed in a bottom surface of the glass body, and a silicone support disposed within the channel. The glass body defines at least one side wall, an upper extent and a bottom surface. The channel has an open end and an inner surface, and the inner surface has a bottom wall, an inner sidewall and an outer sidewall. The open end of the channel has a predetermined width $W_o$. The channel also has a predetermined depth $D_o$. The channel conforms to the relationship $W_o/D_o$ of 3 to 13. The silicone support includes a protruding extent and an interior extent. The interior extent of the silicone support is disposed in the channel, and at least a portion of the interior extent directly contacts the inner surface of the channel. That portion of the silicone support that contacts the inner surface of the channel is adhered to the inner surface of the channel by chemical adhesion. The protruding extent of the silicone support protrudes beyond the open end of the channel.

According to another embodiment of the present invention, a glass dish is provided that includes a body, a channel in the bottom surface of the body, and a silicone support disposed within the channel. The channel has an open end, a substantially planar bottom wall, an inner sidewall and an outer sidewall. The channel also has a predetermined depth $D_o$ in the range of 0.040 to 0.080 inches. The open end of the channel has a predetermined width $W_o$ in the range of 0.25 to 0.50 inches. The channel conforms to the relationships $W_o/D_o$ of 3 to 13 and $D_o/T_o$ of 0.2 to 0.6. The silicone support has a melting point greater than 350° and includes an interior extent and a protruding extent. Further, the protruding extent of the silicone support protrudes at least 0.010 inches beyond the open end of the channel.

In another embodiment of the present invention, a microwavable glass dish is provided. The glass dish has a substantially homogenous glass body, a channel formed in at least a portion of the bottom surface of the glass body, and a silicone support disposed within the channel. The glass body has a first thermal insulative value. The silicone support has a melting point greater than 350° F. The interior extent of the silicone support of the silicone support is disposed in the channel, and at least a portion of the interior extent of the silicone support directly contacts the inner surface of the channel. That portion of the silicone support that contacts the inner surface of the channel is adhered to the inner surface of the channel by chemical adhesion. Further, the protruding extent of the silicone support protrudes beyond the open end of the channel. The silicone support has a second thermal insulative value, and the second thermal insulative value is greater than the first thermal insulative value.

In yet another embodiment of the present invention, a method of manufacturing a glass dish with a silicone support is provided. The method comprises providing a glass dish defined by at least one side wall and a bottom surface. The glass dish has a circumferential channel formed in the bottom surface. The channel of the glass dish has an internal volume. The glass dish is rotated at a first rotation speed through approximately 360 degrees, and a first predetermined volume of silicone is applied in an uninterrupted flow at first flow rate to the channel of the dish. The first predetermined volume of silicone is greater than the internal volume of the channel so that the silicone fills the channel and protrudes beyond an upper extent of the channel. The first rotation speed and the first flow rate are coordinated to achieve a first application density. The glass dish is then rotated at a second rotation speed beyond approximately 360 degrees, and a second predetermined volume of silicone is applied in an uninterrupted flow at a second flow rate to the channel of the dish to form an overlap of the applied silicone. The second rotation speed and the second flow rate are coordinated to achieve a second application density which is less than the first application density. The first predetermined volume of silicone occurs at the same time that the glass dish is rotated at the first rotation speed. The step of applying the second predetermined volume of silicone occurs at the same time as the step of rotating the glass dish at the second rotation speed. The method also includes curing the silicone to form a substantially seamless silicone support.

According to another embodiment of the present invention, a glass dish suitable for use in cooking applications is provided. The glass dish comprises a body, a channel and a silicone gripping surface. The glass body is formed from substantially homogenous glass. The channel is formed in a portion of the glass body and has an open end and an inner surface. The inner surface of the channel is comprised of a bottom wall, an inner sidewall and an outer sidewall. The channel has a predetermined depth $D_o$, and at least a portion of the open end of the channel has a predetermined width $W_o$. The channel conforms to the relationship $W_o/D_o=3$ to 13.

The silicone gripping surface is comprised of a protruding extent and an interior extent. The interior extent of the silicone support is disposed within the channel. At least a portion of the interior extent of the silicone gripping surface directly contacts at least a portion of the inner surface of the channel and is adhered thereto by chemical adhesion. The protruding extent of the silicone gripping surface protrudes beyond the open end of the channel.

According to another embodiment of the present invention, a glass dish suitable for use in cooking applications is provided. The glass dish is comprised of a body, a handle surface, a channel and a silicone gripping surface. The body is formed from substantially homogenous glass. The handle surface is formed substantially of homogenous glass and has a predetermined thickness $T_o$.

The channel is formed in the handle surface and has an open end and an inner surface. The inner surface of the channel has a substantially planar bottom wall, an inner sidewall and an outer sidewall. The channel has a predetermined depth $D_o$ in the range of 0.040 to 0.080 inches. At least a widest portion of the open end of the channel has a predetermined width $W_o$ in the range of 0.25 to 0.50 inches. Further, at least the widest portion of the channel conforms to the relationships $W_o/D_o=3$ to 25 and $D_o/T_o=0.2$ to 0.6.

The silicone gripping surface has a protruding extent and an interior extent. The interior extent of the silicone gripping surface is disposed within the channel. At least a portion of the interior extent of the silicone gripping surface directly contacts at least a portion of the inner surface and is adhered thereto by chemical adhesion. The protruding extent of the silicone gripping surface extends to a height $H_o$ of at least 0.010 inches beyond the open end of the channel. Furthermore, the silicone support has a melting point greater than 350° F.

According to still another embodiment of the present invention, a glass dish suitable for use in microwave cooking application is provided. The glass dish is comprised of a body, a handle surface, a channel and a silicone gripping surface. The body has a handle surface formed from substantially homogenous glass. The handle surface has a first thermal insulative value. The channel is formed in at least a portion of the handle surface. The channel has an open end and an inner surface that includes a bottom wall, an inner sidewall and an outer sidewall.

The silicone gripping surface includes a protruding extent and an interior extent. The interior extent of the silicone gripping surface is disposed within the channel. At least a portion of the interior extent of the silicone gripping surface directly contacts at least a portion of the inner surface, and is adhered to the inner surface of the channel by chemical adhesion. The protruding extent of the silicone gripping surface protrudes beyond the open end of the channel. The silicone gripping surface has a melting point greater than 350° F., and a second thermal insulative value that is greater than the first thermal insulative value.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

Figure 1:
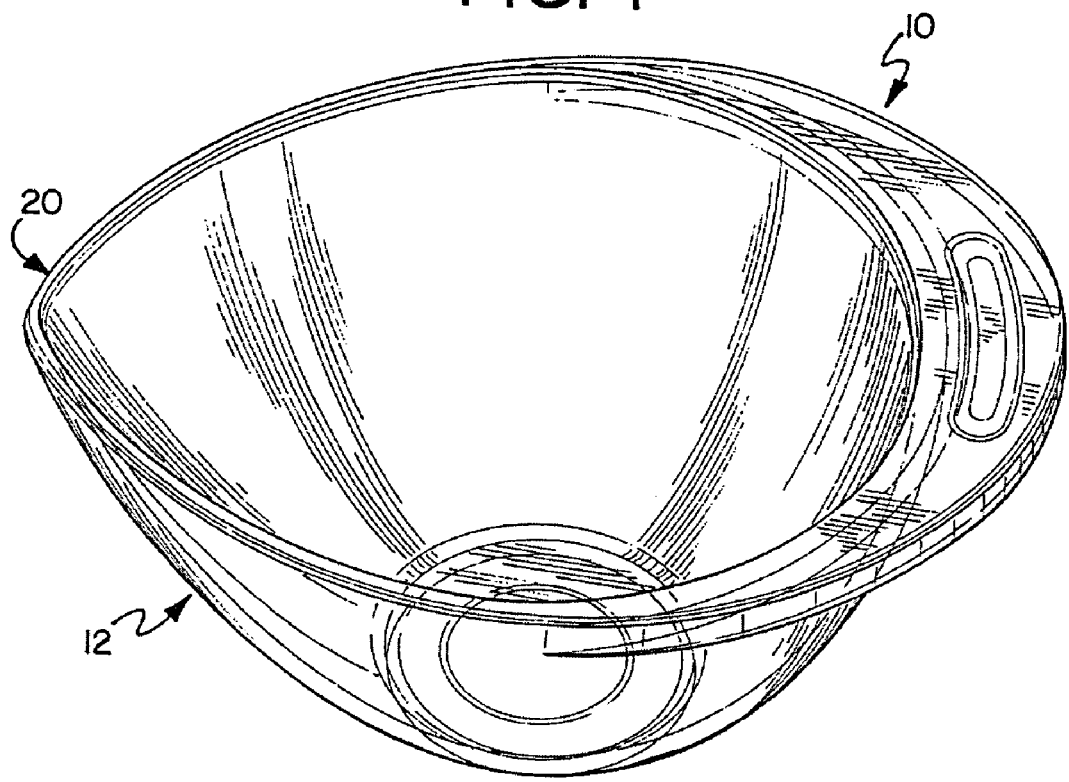
FIG. 1 is a perspective view of a glass dish with silicone support according to one embodiment of the present invention.

The components in the drawings are not necessarily to scale, emphasis instead being placed upon clearly illustrating the principles of the present invention.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now in detail to FIGS. 1-15, there is shown generally a glass dish 10. Glass dish 10 includes a body 12, channel 14 and silicone support 16. Glass dish 10 may be any type of glassware. For example, glass dish 10 may be a cup, including a measuring cup, a bowl, a platter, vessel, a baking dish, container or other glass houseware without departing from the present invention.

Body 12 defines at least one side wall 18, an upper extent 20 and a bottom surface 22 and is preferably formed from substantially homogenous glass. It will be appreciated that substantially homogenous glass includes pure glass as well as glass having some particulate or other additive or material, but is not intended to include ceramics. In one preferred embodiment the glass is suitable for use in microwave applications. Accordingly, the body may be formed from borosilicate glass, soda lime glass or other glass as known to those of skill in the art, and is preferably formed from the same glass as used in products sold under the Pyrex® brand name.

Figure 2:
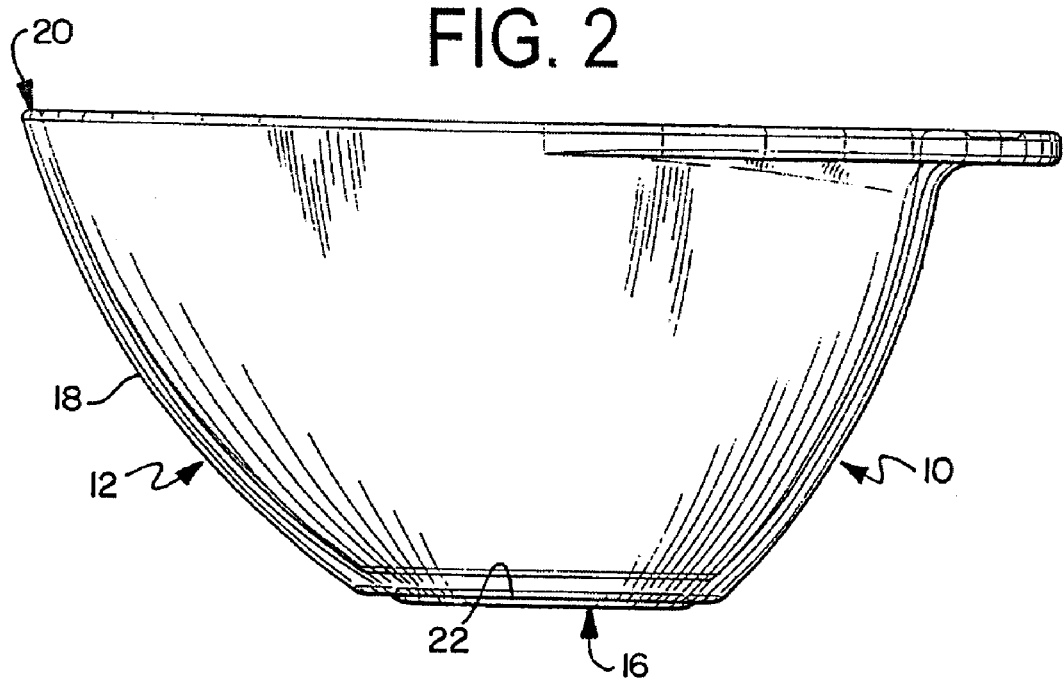
FIG. 2 is a side elevation view of the glass dish with silicone support shown in FIG. 1.
Figure 3:
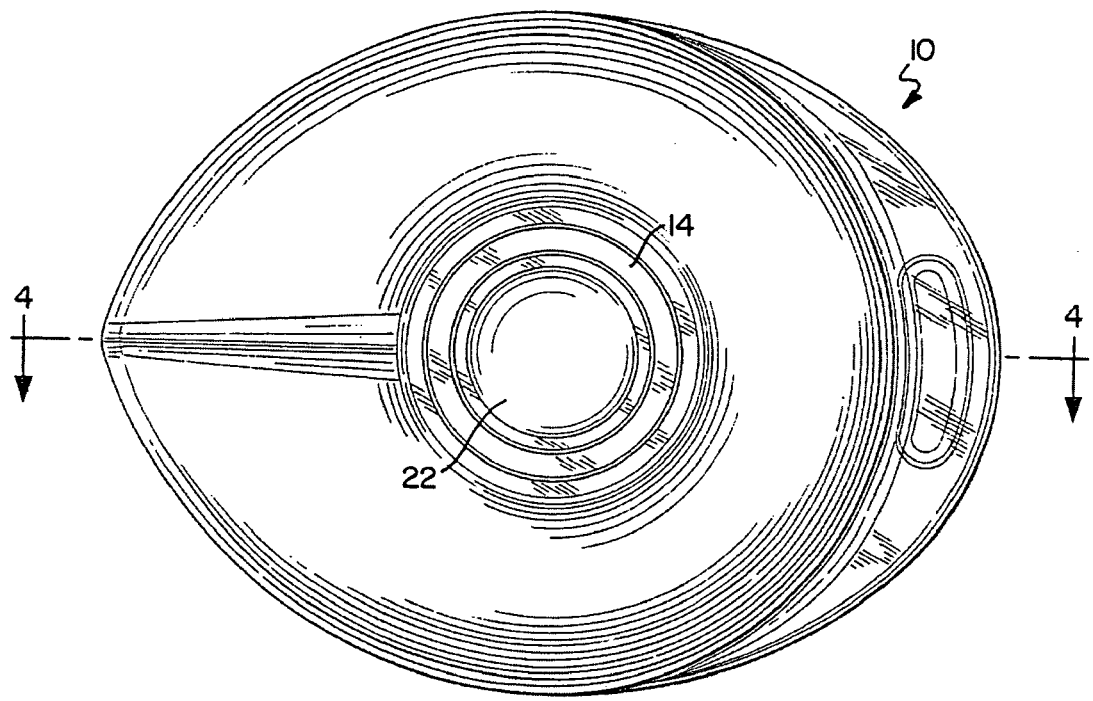
FIG. 3 is a bottom plan view of the glass dish with silicone support shown in FIG. 1.
Figure 4:
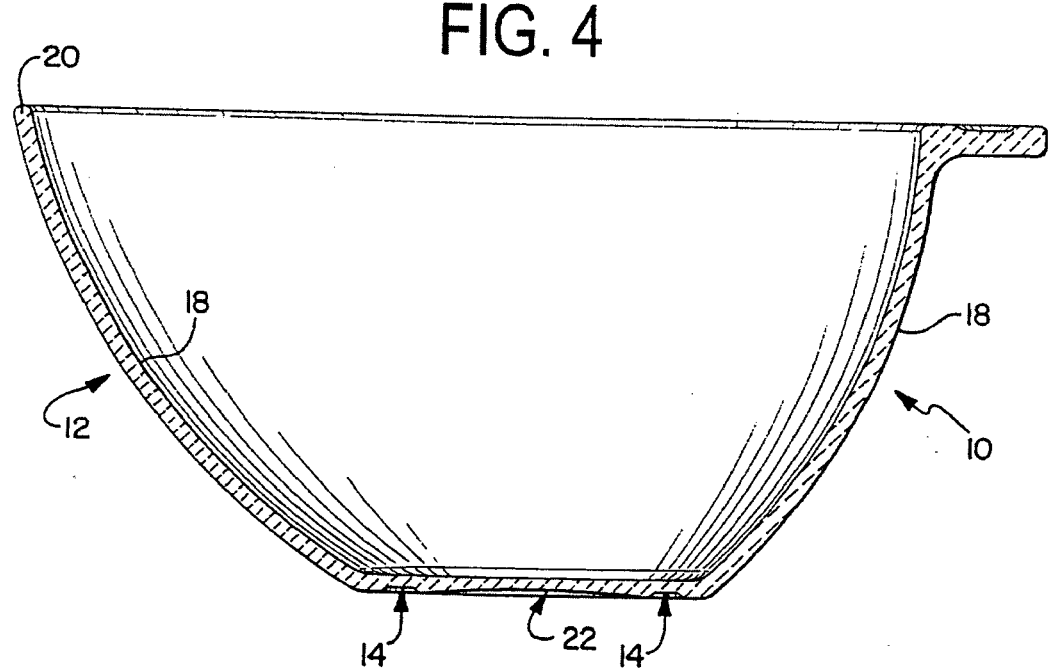
FIG. 4 is a cross-sectional view of the glass dish with silicone support shown in FIG. 1 taken through the line 4-4.
Figure 5:
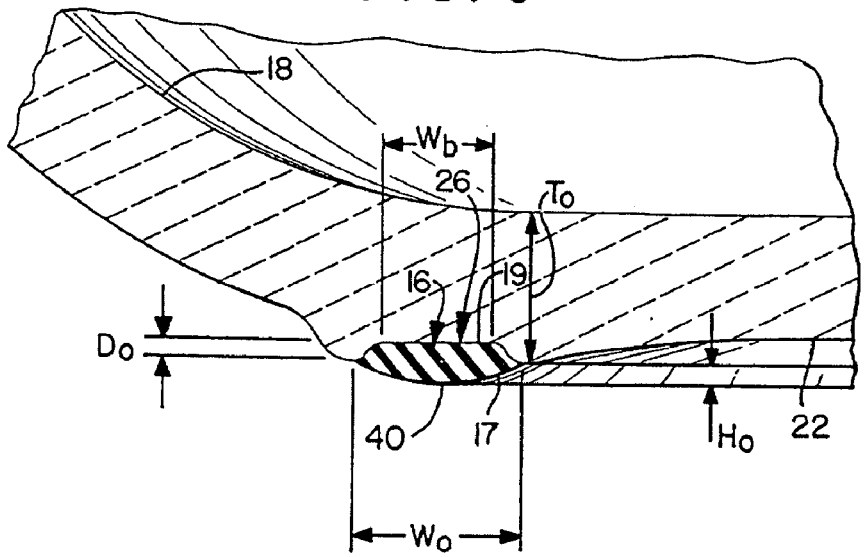
FIG. 5 is an enlarged cross-sectional view of the glass dish with silicone support shown in FIG. 4.
Figure 6:
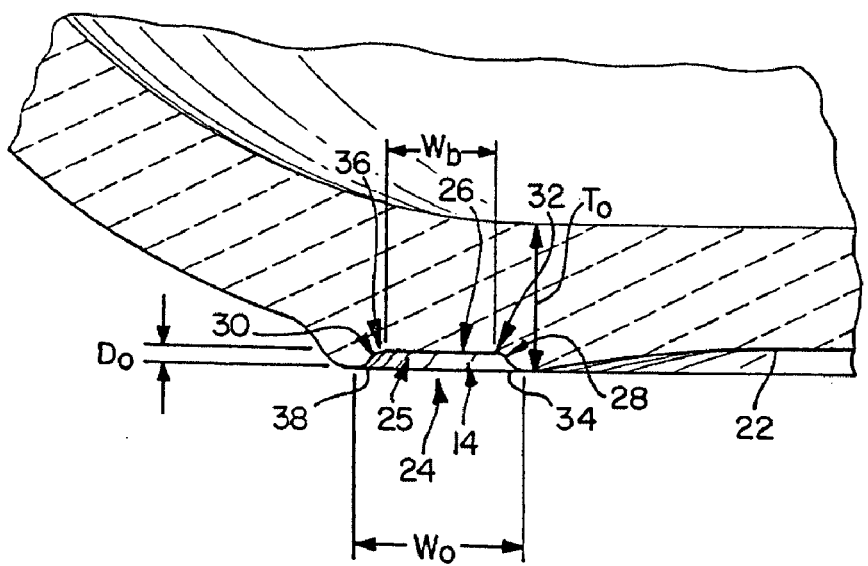
FIG. 6 is an enlarged cross-sectional view of the glass dish shown in FIG. 4 without the silicone support.
Figure 7:
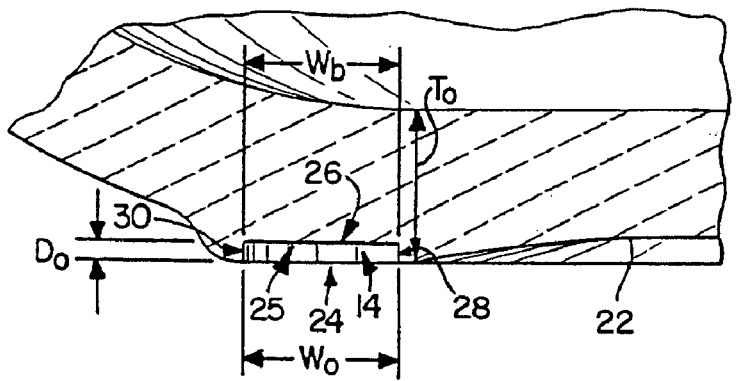
FIG. 7 is an enlarged cross-sectional view of another embodiment of the present invention without the silicone support.
Figure 8:
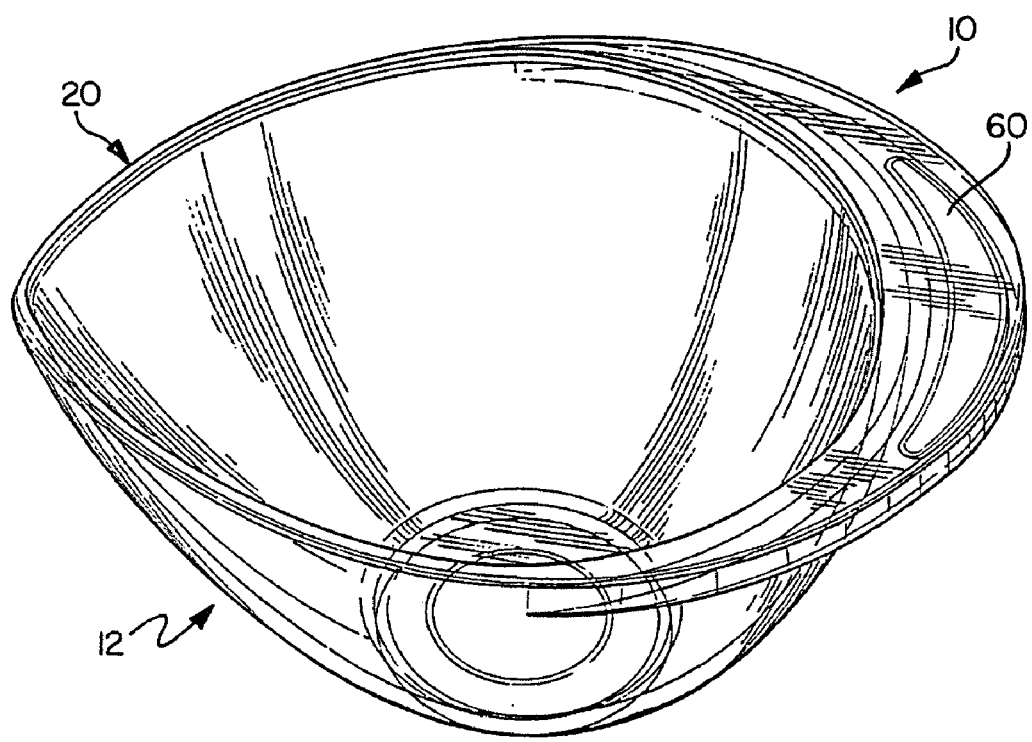
FIG. 8 is a perspective view of a glass dish with silicone gripping surface according to another embodiment of the present invention.
Figure 9:
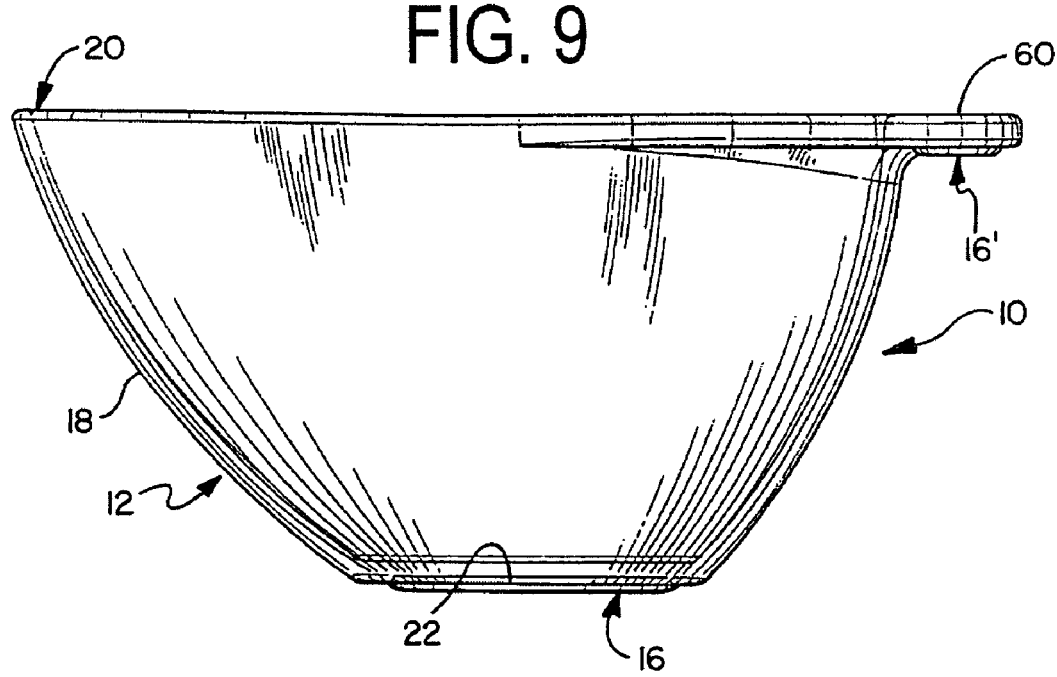
FIG. 9 is a side elevation view of the glass dish with silicone gripping surface shown in FIG. 8.
Figure 10:
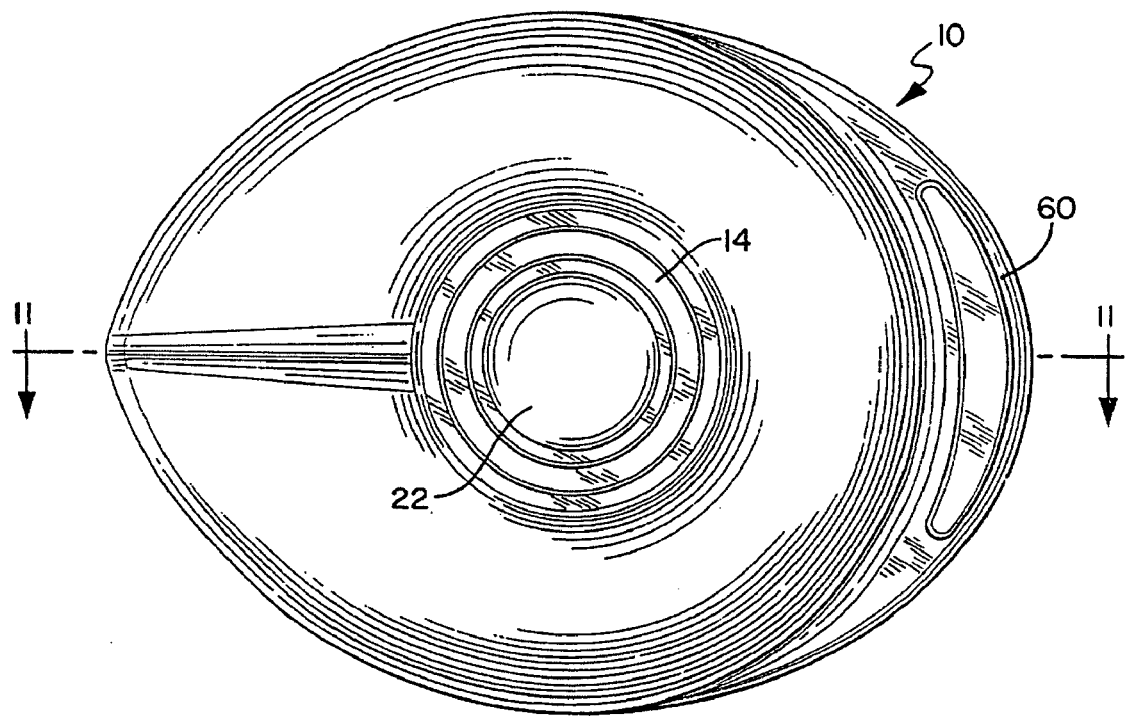
FIG. 10 is a bottom plan view of the glass dish with silicone gripping surface shown in FIG. 8.
Figure 11:
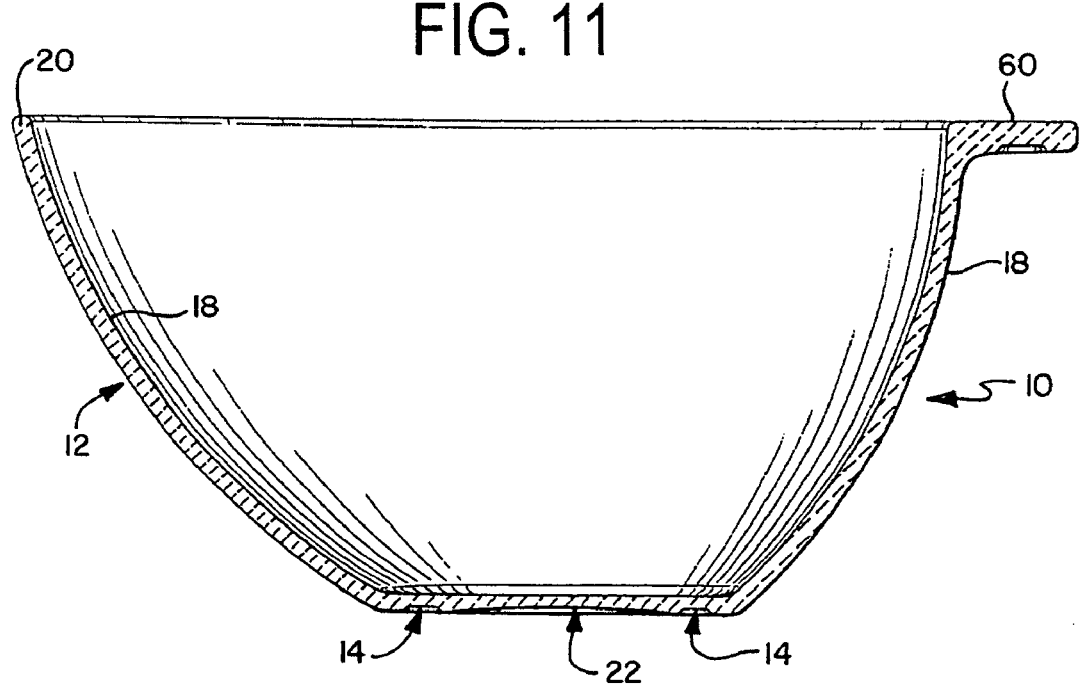
FIG. 11 is a cross-sectional view of the glass dish with silicone gripping surface shown in FIG. 8 taken through the line 11-11.

Body 12 preferably has a thickness $T_o$ in the range of 0.14 to 0.20 inches. However, it is contemplated that body 12 of the present invention have any thickness suitable for cookware and which may conform to the relative relationships described herein. As shown in FIGS. 5-7, $T_o$ does not need to be constant through the entire bottom surface of body 12. While body 12 is illustrated in FIGS. 1-3 as being a generally elliptical or egg-shaped bowl with a single side wall 18, it is contemplated that the body 10 can be of other geometries including geometries having multiple side walls.

Channel 14 can be formed in all or at least a portion of the bottom surface of the glass body and is configured to receive the silicone that forms the silicone support 16. Channel 14 acts as a target area for ease of application of the silicone support and protects the silicone support 16 from damage during use of dish 10. According to the present invention, a substantial portion of silicone support 16 is disposed within channel 14, and is thus shielded from direct contact with many outside forces. As shown in FIGS. 1-7, the cross-sectional profile of channel 14 of the present invention is generally non-arcuate. According to the present invention, the target area for application of the silicone is improved as the channel 14 conforms to a more rectangular cross-sectional profile. Furthermore, a more rectangular cross-section provides better protection of the silicone support 16 from mechanical damage than those channels configured to form an arcuate cross-section.

Channel 14 has an open end 24 and an inner surface 25. Inner surface 25 is defined by a bottom wall 26, an inner sidewall 28 and an outer sidewall 30. While it is desirable that the bottom wall 26 intersects the sidewalls 28 and/or 30 at substantially a right angle, some radius at the intersection is typically present to aid in the forming process. Accordingly, channel 14 preferably includes a first inner radial panel 32, a second inner radial panel 34, a first outer radial panel 36 and a second outer radial panel 38. First inner radial panel 32, second inner radial panel 34, first outer radial panel 36 and second outer radial panel 38 each have a relatively small radius. In one preferred embodiment, the radii of each of these panels 32, 34, 36 and 38 is approximately 0.40 R. According to the present invention, bottom wall 26 is substantially planar such that the bottom wall 26 is disposed generally parallel to a surface upon which the dish may rests.

In one embodiment, inner and outer sidewalls 28 and 30 of channel 14 are also generally planar. In that embodiment, outer sidewall 30 and inner sidewall 28 each form an angle α between approximately 85 and 90 degrees with respect to a plane defined by bottom wall 26. As shown in FIG. 7, in one embodiment, side walls 28 and 30 and bottom wall 26 form a substantially rectangular cross-sectional profile.

Certain geometric factors are useful in describing the configuration of the channel of the present invention. As illustrated in FIGS. 5 and 6, channel 14 has an open end width $W_o$, a bottom wall width $W_b$ and a depth $D_o$. Open end width $W_o$ is in the range of approximately 0.25 to approximately 0.50 inches, bottom wall width $W_b$ is in the range of 0.10 to 0.35 inches, and a depth $D_o$ in the range of approximately 0.04 to approximately 0.08 inches. More preferably, depth $D_o$ is in the range of 0.045 to 0.05 inches, and most preferably depth $D_o$ is 0.047 inches. Most preferably, the open end width $W_o$ of the channel is 0.415 inches or approximately 0.4 inches. Channel 14 generally conforms to the relationship $W_o/D_o$ is in the range of 3 to 13, and more preferably is in the range of 8 to 10, and most preferably about 10. Preferably, open end width $W_o$, bottom wall width $W_b$ and depth $D_o$ are constant throughout the entire profile of the channel. However, it is contemplated by the present invention that only predetermined portions of the channel profile conform to these dimensions. For example, in some instances as discussed below the channel 14 may be obround or crescent shape. Thus the width $W_o$ may vary across the profile of the channel 14.

In one embodiment of the present invention, channel 14 conforms to the perimeter contour of the bottom surface 22 of the dish. For example, the bottom surface of the embodiment illustrated in FIGS. 1-7 is generally circular. Accordingly, channel 14 is configured as a ring. In the embodiment shown in FIGS. 1-7, the ring is circumferentially disposed within bottom surface 22 of body 12. Alternatively, channel 14 may be configured as a square, rectangular or other symmetric or asymmetric shape.

In providing a dish according to the present invention, it is desirable that the dimensions of channel 14 not diminish the mechanical strength of body 12. To assist in accomplishing this, the depth of the channel $D_o$ and the thickness of the glass $T_o$ preferably conform to the relationship $D_o/T_o=0.2$ to $0.6$, and most preferably conform to the relationship $D_o/T_o=0.24$.

Silicone support 16 provides a contact surface with a table, countertop or other work surface and aids in providing a non-slip quality of the dish 10. The physical properties of silicone make it particularly suitable for application in the present invention. In particular, silicone is characterized by its resistance to heat in temperatures in excess of 500° F. In one embodiment the silicone support has a melting point of up to 600° F. This heat stability helps to minimize cracking, melting or delaminating in high temperature environment. Silicone also readily accepts colorants and dyes, and is resistant to discoloration, making it aesthetically desirable. Silicone support 16 is preferably composed of LIM silicone, such as LIM8040 manufactured by the General Electric Company or some variant thereof. However, it is contemplated by the present invention, that silicone support be any silicone formulation suitable for use in cooking environments without departing from the present invention.

In some applications, silicone support 16 may act as an insulating trivet. In such instances, silicone support 16 thermally insulates a surface upon which the dish 10 rests from body 12. For example, if dish 10 is a glass dish and its food contents are heated in a microwave oven, microwave energy heats the contents of dish 10. The glass body reacts with microwave energy only to a certain degree, and has certain has a thermal insulative value. The primary warming of the glass will be through the warmed food contents. Silicone itself is not strongly interactive with microwave energy, and has a greater thermal insulative value than the glass. In this case, the glass will act as a barrier between the food contents and the silicone support. Silicone support 16 also has a soft non-marring quality.

Silicone support 16, in one embodiment, is a continuous, uninterrupted and substantially seamless silicone layer. Silicone support 16 includes a protruding extent 17 and an interior extent 19. All or at least a portion of interior extent 19 of silicone support 16 directly contacts inner surface 25 of channel 14, and there is no separate intermediate bonding agent between interior extent 19 of silicone support 16 and channel 14. Preferably, there is little or no gap between interior extent 19 and the inner surface 25 of channel 14. According to the present invention, all or at least a portion of interior extent 19 of silicone support 16 is disposed within and is adhered and chemically bonded to all or at least a portion of the inner surface 25 of channel 14. Silicone support 16 is adhered to channel 14 by chemical adhesion. In one embodiment, silicone support 16 is held in place solely by chemical adhesion, and is not assisted by mechanical means. However, it is contemplated that the channel 14 be configured to provide additional mechanical support to assist in holding and further protecting silicone support 16 within channel 14.

In a preferred embodiment, protruding extent 17 of the silicone support forms a reverse meniscus 40 at the farthest point at which it protrudes. This meniscus is naturally created during the silicone application process. Preferably, protruding extent 17 protrudes along the channel to a substantially uniform height beyond the open end 24 of channel 14, $H_o$. This uniformity will provide both structural stability of dish 10 and improved aesthetics. In a preferred embodiment, height $H_o$ is at least 0.01 inches, and most preferably in the range of approximately 0.02 to approximately 0.05 inches. $H_o$ can be greater than 0.05 inches depending on the viscosity of the silicone and the interrelated ability of the silicone to flow, among other factors.

It should be understood that, while the embodiment of the present invention described thus far, is directed to a silicone support adhered to a ring shaped channel on the bottom surface of a dish, the channel may be disposed in other locations on the dish or in configurations other than a ring. According to one such embodiment shown in FIGS. 8-15, the dish 10 is comprised of a body 12 having a handle surface 60. The handle surface 60 is formed of substantially homogenous glass and has a predetermined thickness $T_o$.

A channel 14 is formed in the handle surface 60. As discussed above, the channel 14 generally has an open end 24 and an inner surface 25. The inner surface 25 is comprised of a substantially planar bottom wall 26, an inner sidewall 28 and an outer sidewall 30. The channel 14 may define any suitable geometric shape which provides a suitable application area and volume for receiving a silicone gripping surface 16'. For example as shown in FIGS. 8-15, the channel 14 may be obround (i.e., having two parallel sides and semicircular ends) or crescent shaped. However, one of skill in the art will understand that the present invention does not limit the geometry of the channel to these two shapes.

Figure 12:
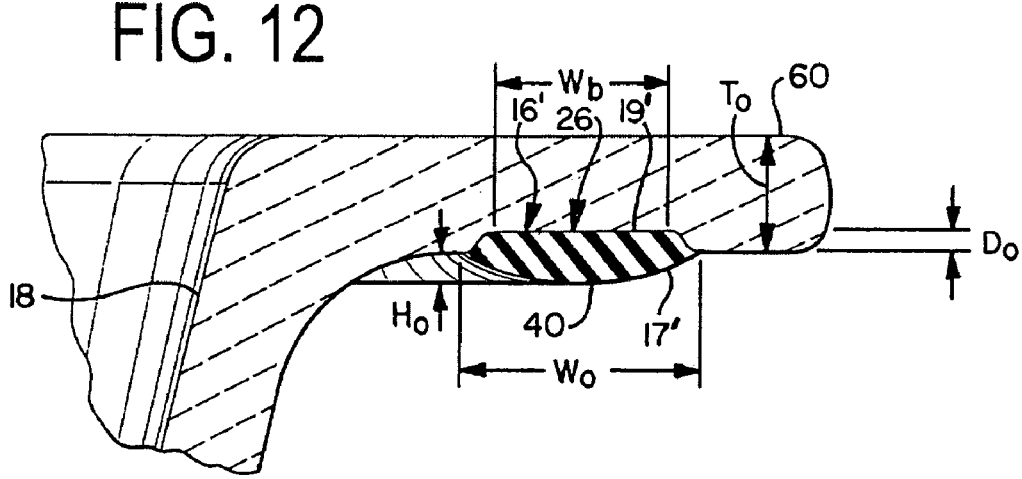
FIG. 12 is an enlarged cross-sectional view of the glass dish with silicone gripping surface shown in FIG. 11.
Figure 13:
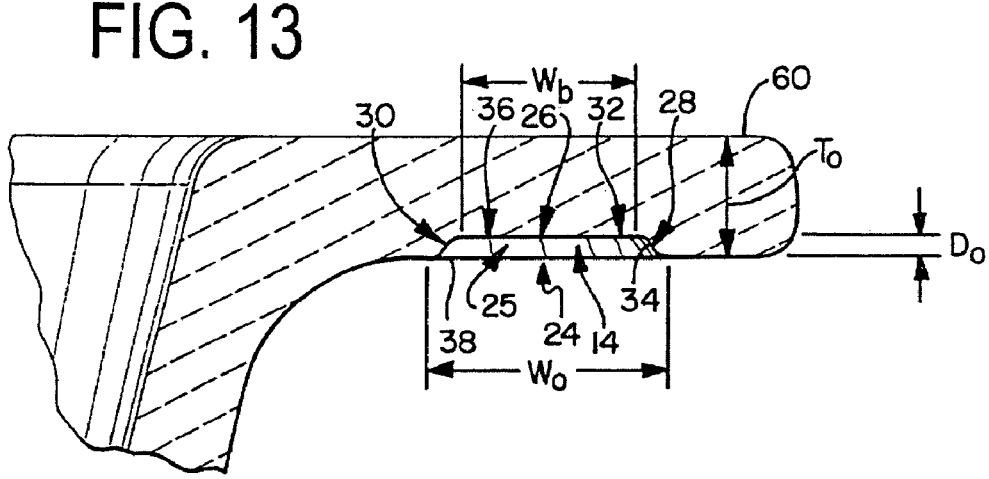
FIG. 13 is an enlarged cross-sectional view of the glass dish shown in FIG. 11 without the silicone gripping surface.
Figure 14:
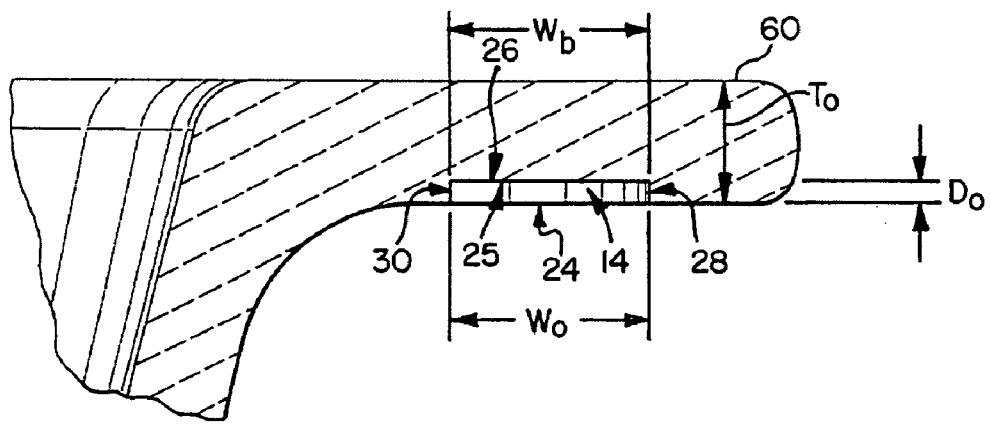
FIG. 14 is an enlarged cross-sectional view of another embodiment of the present invention without the silicone gripping surface; and, FIG. 15 is a partial perspective view of another embodiment of a glass dish with silicone gripping surface according to one embodiment of the present invention.
Figure 15:
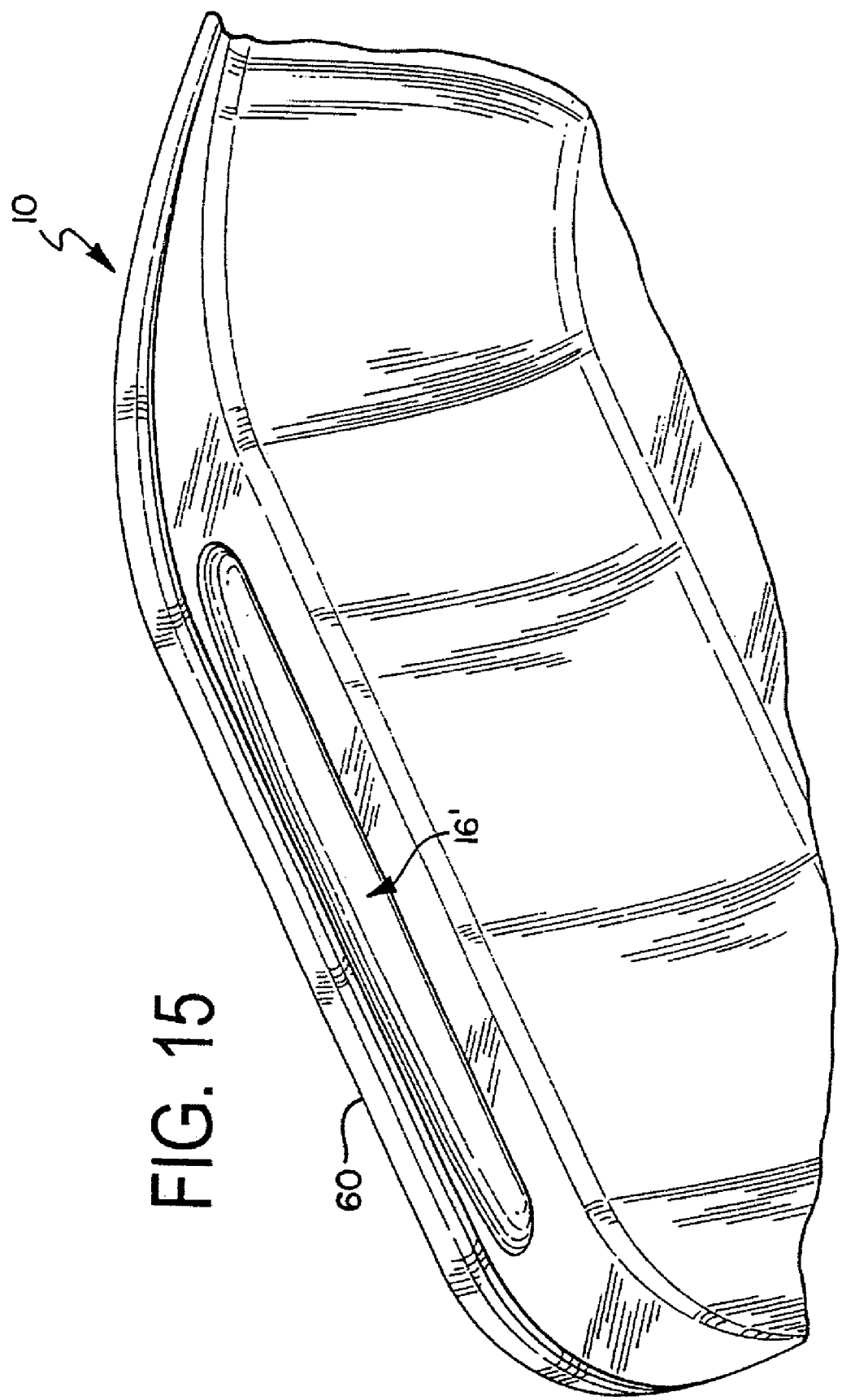

As shown in FIGS. 12-14, the channel 14 preferably has a predetermined depth $D_o$ in the range of 0.040 to 0.080 inches. The open end of the channel 14 preferably has a predetermined width $W_o$ in the range of 0.25 to 1.00 inches. Most preferably the open end of the channel 14 has a predetermined width $W_o$ of 0.50 inches. According to this embodiment of the invention, at least the widest portion of the channel 14 conforms to the relationships $W_o/D_o=3$ to 25 and $D_o/T_o=0.2$ to 0.6.

As shown in FIG. 12, the dish 10 further includes a silicone gripping surface 16'. The silicone gripping surface 16' is comprised of a protruding extent 17' and an interior extent 19'. The interior extent 19' of the silicone gripping surface 16' is disposed within the channel 14. At least a portion of the interior extent 19' of the silicone gripping surface 16' directly contacts at least a portion of the inner surface 25 and is adhered to the inner surface 25 of the channel 14 by chemical adhesion. The protruding extent 17' of the silicone gripping surface 16' protrudes beyond the open end of the channel 14. According to this embodiment, the silicone gripping surface 16' preferably has a melting point greater than 350° F. Further, the silicone gripping surface 16' preferably has a second thermal insulative value greater than the first thermal insulative value.

In another embodiment, silicone gripping surface 16' may be applied to the lid of a product to reduce noise when placing it on the base of the product. There may be several separate channels 14 spaced apart around the circumference of the lid. Thus, the channel 14 does not need to be continuous. The channel 14 need not be a ring or even arcuate. For example, one or a series of relatively-short and linear channels, or several spaced-apart rounded areas may be utilized.

The present invention also includes a method of manufacturing a glass dish with a silicone support. One such method used in connection with circular silicone applications is described in U.S. patent application Ser. No. 11/052,532, the disclosure of which is incorporated herein by reference.

Generally, a glass dish may be formed or manufactured through conventional forming processes into a shape that includes a channel formed therein. The glass dish is then heat treated in its standard processes to impact appropriate physical and thermal properties for the dish's intended use. Preferably the resulting channel will have a defined shape, and have an internal volume being defined with by sidewalls and a bottom wall. It is understood that the channel may define any shape suitable for the geometry of the dish.

A predetermined and precise volume of a silicone is deposited into the channel. Because of its low viscosity, the silicone channel directs the movement of the silicone, thereby aiding in conforming the silicone to the shape of the channel. The channel also aids in having the silicone form a substantially perfect circle of material. The silicone may be applied through pressurized application, optionally by use of a precision nozzle. The silicone is fed by a pumping system from a reservoir. The predetermined volume of silicone is greater than the internal volume of the channel. Because the volume of silicone applied is greater than the volume of the channel, the silicone fills the channel and, when application is complete, protrudes beyond its upper extent to form a reverse meniscus. In the preferred embodiment, the volume of silicone applied is 10 to 20 percent greater than the volume of the channel. The silicone is preferably applied in an uninterrupted flow at a flow rate.

Once the silicone is applied, the silicone is cured in an oven or by other means known to those of skill and at a prescribed time and temperature as suitable for such purposes. Preferably, the curing will take place in an oven at 400° F. for between 5 and 10 minutes. The curing process causes the silicone to harden and impacts the final physical and chemical properties to the material.

While the specific embodiments have been illustrated and described, numerous modifications come to mind without significantly departing from the spirit of the invention, and the scope of protection is only limited by the scope of the accompanying Claims

What is claimed is:

1. A glass dish suitable for use in cooking applications, the glass dish comprising:
    a body having a handle surface, the handle surface being formed from substantially homogenous glass and having a predetermined thickness $T_o$;
    a channel formed in the handle surface, the channel having an open end and an inner surface, the inner surface comprising a substantially planar bottom wall, an inner sidewall and an outer sidewall, the channel having a predetermined depth $D_o$ in the range of 0.040 to 0.080 inches and at least a widest portion of the open end of the channel having a predetermined width $W_o$ in the range of 0.25 to 0.50 inches, at least the widest portion of the channel conforming to the relationships $W_o/D_o$=3 to 25 and $D_o/T_o$=0.2 to 0.6; and
    a silicone gripping surface comprising a protruding extent and an interior extent, the interior extent of the silicone gripping surface disposed within the channel, at least a portion of the interior extent of the silicone gripping surface directly contacting at least a portion of the inner surface and being adhered thereto by chemical adhesion, wherein the protruding extent of the silicone gripping surface extends to a height $H_o$ of at least 0.010 inches beyond the open end of the channel, the silicone support having a melting point greater than 350° F.

2. The dish of claim 1 wherein the width $W_o$ of the channel is approximately 0.5 inches.

3. The dish of claim 2 wherein the depth $D_o$ of the channel is in the range of 0.045 to 0.05 inches.

4. The dish of claim 1 wherein a least the widest portion of the channel conforms to the relationship $W_o/D_o$=8 to 10.

5. The dish of claim 1 wherein the channel is generally obround.

6. The dish of claim 1 wherein the channel is generally crescent-shaped.

7. A microwavable glass dish suitable for use in microwave cooking applications, the glass dish comprising:
    a body having a handle surface formed from substantially homogenous glass, the handle surface having a first thermal insulative value;
    a channel formed in at least a portion of the handle surface, the channel having an open end and an inner surface, the inner surface comprising a bottom wall, an inner sidewall and an outer sidewall; and
    a silicone gripping surface comprising a protruding extent and an interior extent, the interior extent of the silicone gripping surface disposed within the channel, at least a portion of the interior extent of the silicone gripping surface directly contacting at least a portion of the inner surface and being adhered to the inner surface of the channel by chemical adhesion, wherein the protruding extent of the silicone gripping surface protrudes beyond the open end of the channel, wherein the silicone gripping surface has a melting point greater than 350° F., and wherein the silicone gripping surface has a second thermal insulative value, the second thermal insulative value being greater than the first thermal insulative value.

8. The dish of claim 7 wherein the protruding extent of the silicone gripping surface protrudes to a height $H_o$ of at least 0.01 inches beyond the open end of the channel, the channel has a width $W_o$ in the range of 0.25 to 0.50 inches, the channel has a depth $D_o$ in the range of 0.045 to 0.050 inches, and the handle surface has a thickness $T_o$, the dish conforming to the relationship $D_o/T_o$=0.2 to 0.6.

9. The dish of claim 7 wherein the channel is generally obround.

10. The dish of claim 7 wherein the channel is generally crescent-shaped.

* * * * *